(12) United States Patent
Goli et al.

(10) Patent No.: US 12,724,765 B2
(45) Date of Patent: Sep. 1, 2026

(54) IN-DATABASE WORKFLOW ORCHESTRATION FOR SERVERLESS FUNCTION

(71) Applicant: Oracle International Corporation, Redwood Shores, CA (US)

(72) Inventors: Rahul Goli, Redwood Shores, CA (US); Noman Sheikh, Redwood Shores, CA (US); Harshad Kasture, Sunnyvale, CA (US); Alexander Ulrich, Freiburg (DE)

(73) Assignee: Oracle International Corporation, Redwood Shores, CA (US)

( * ) Notice: Subject to any disclaimer, the term of this patent is extended or adjusted under 35 U.S.C. 154(b) by 82 days.

(21) Appl. No.: 18/384,808

(22) Filed: Oct. 27, 2023

(65) Prior Publication Data

US 2025/0139082 A1 May 1, 2025

(51) Int. Cl.
*G06F 16/23* (2019.01)
*G06F 16/25* (2019.01)

(52) U.S. Cl.
CPC ........ *G06F 16/2379* (2019.01); *G06F 16/252* (2019.01)

(58) Field of Classification Search
CPC ........................... G06F 16/2379; G06F 16/252
See application file for complete search history.

(56) References Cited

U.S. PATENT DOCUMENTS 10,225,164 B2 * 3/2019 Revanuru ............... H04L 41/40
10,592,493 B1 * 3/2020 Sutherland .......... G06F 16/2343
11,061,965 B1 * 7/2021 Heisz .................. G06F 16/2471
11,463,422 B1 * 10/2022 Kowalski .............. H04L 63/061
2003/0023773 A1 * 1/2003 Lee ....................... G06F 9/4486 712/E9.083
2011/0302132 A1 * 12/2011 Muthuvelu ............ G06Q 10/06 707/607
2018/0357291 A1 * 12/2018 Choi .................. G06F 16/2379

(Continued)

OTHER PUBLICATIONS

Wimmer, Christian et al., "Initialize Once, Start Fast: Application Initialization at Build Time", Proc. ACM Program. Lang., vol. 3, No. OOPSLA, Article 184. Publication date: Oct. 2019, 29 pages.

(Continued)

*Primary Examiner* — Alicia M Willoughby
(74) *Attorney, Agent, or Firm* — Hickman Becker Bingham Ledesma LLP; Stephen R. Tkacs

(57) ABSTRACT

The illustrative embodiments provide a framework for executing data-centric workflows within the database session, thus achieving workflow execution with no additional process creation, virtualization, or network overhead. The user-provided serverless functions that comprise the application workflow are compiled into native-image binary executables and deployed as stored procedures. Using native-image stored procedures greatly reduces memory and execution time overhead compared to traditional serverless computing frameworks. An application workflow is configured using workflow metadata, which specifies the native-image stored procedures that make up the application workflow and transaction boundaries at runtime. The framework ensures low overhead fault tolerance using run-to-completion and exactly-once semantics.

19 Claims, 6 Drawing Sheets

(56) References Cited

U.S. PATENT DOCUMENTS

| | | | | |
|---|---|---|---|---|
| 2020/0293920 | A1* | 9/2020 | Chung | G06N 5/022 |
| 2021/0067422 | A1* | 3/2021 | Stavisski | H04L 12/66 |
| 2021/0303154 | A1* | 9/2021 | Zhang | G06F 3/0685 |
| 2022/0197682 | A1* | 6/2022 | Nigro | G06F 9/44589 |
| 2024/0126745 | A1* | 4/2024 | Krishnaswamy | G06F 16/2343 |
| 2025/0021377 | A1* | 1/2025 | Gorge | G06F 9/4881 |

OTHER PUBLICATIONS

Wimmer, Christian et al., "Initialize Once, Start Fast: Application Initialization at Build Time", Initialize Once, Start Fast: Application Initialization at Build Time. Proc. ACM Program. Lang. 3, OOPSLA, Article 184, Oct. 2019, 29 pages.

Kraft, Peter et al., "Apiary: A DBMS-Backed Transactional Function-as-a-Service Framework", Aug. 2022, 14 pages.

Burckhardt, Sebastian et al., "Serverless Workflows with Durable Functions and Netherite", Feb. 16, 2021, 14 pages.

Burckhardt, Sebastian et al., "Durable Functions: Semantics for Stateful Serverless", roc. ACM Program. Lang. 5, OOPSLA, Article 133, Oct. 2021, 27 pages, available: https://doi.org/10.1145/3485510, 27 pages.

* cited by examiner

FIG. 3

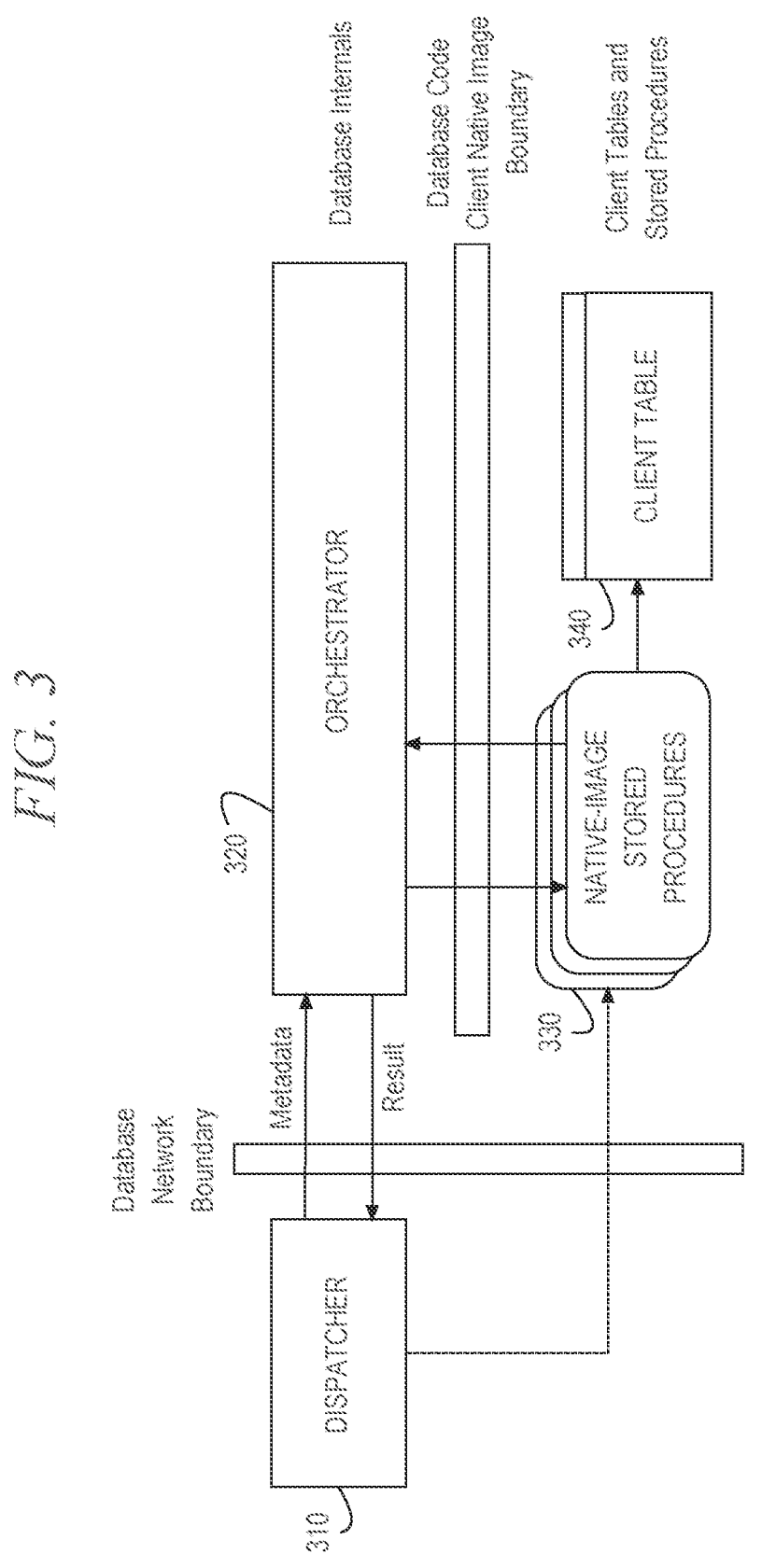

310
DISPATCHER
Database Network Boundary
Metadata
Result
320
ORCHESTRATOR
Database Internals
Database Code Client Native Image Boundary
330
NATIVE-IMAGE STORED PROCEDURES
340
CLIENT TABLE
Client Tables and Stored Procedures

TRANSACTION 0
STORED PROCEDURE 0

TRANSACTION 1
STORED PROCEDURE 1

TRANSACTION 2
STORED PROCEDURE 2

TRANSACTION 0
STORED PROCEDURE 0
STORED PROCEDURE 1

TRANSACTION 1
STORED PROCEDURE 2

FIG. 6

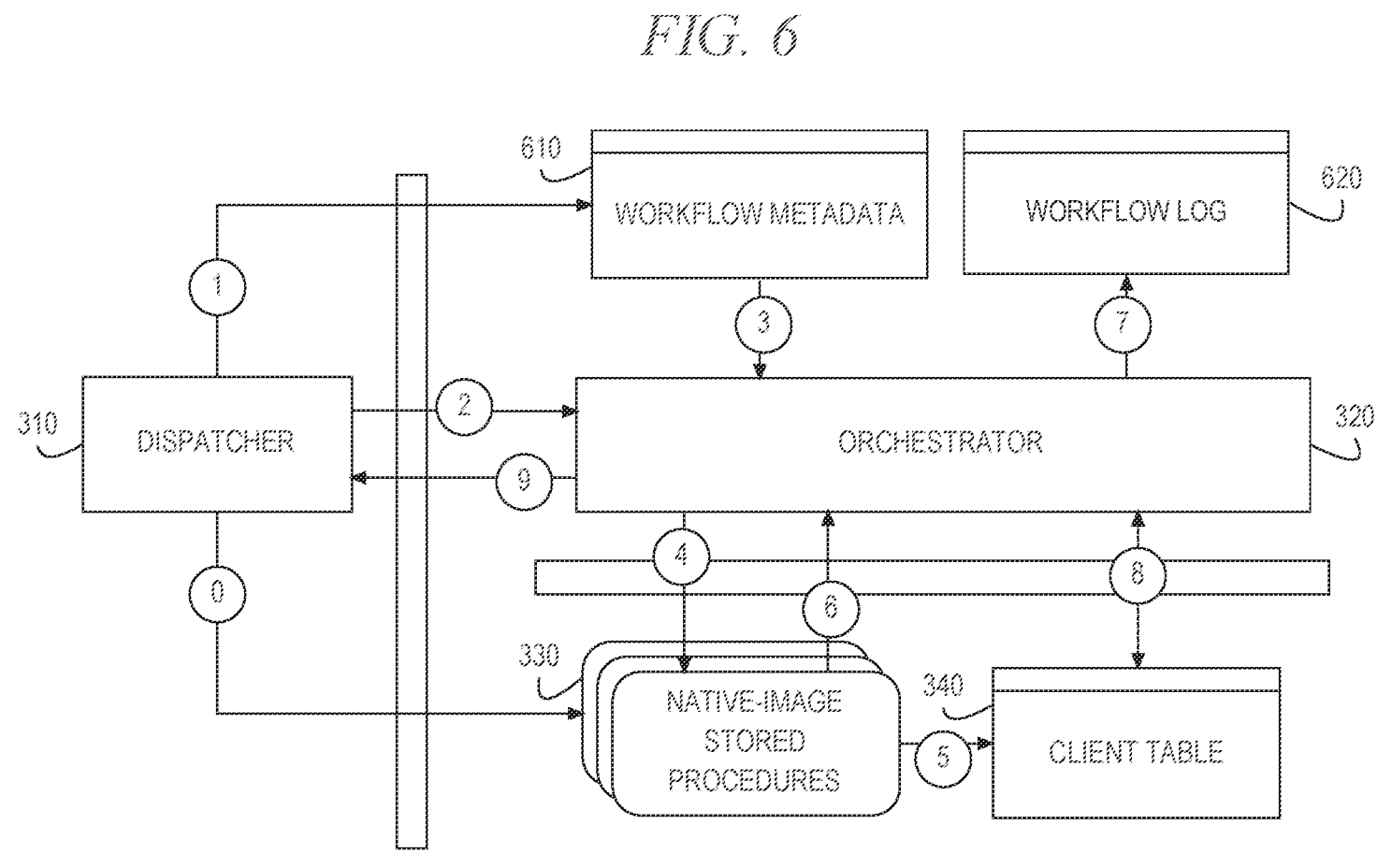

WORKFLOW METADATA 610

WORKFLOW LOG 620

ORCHESTRATOR 320

CLIENT TABLE 340

NATIVE-IMAGE STORED PROCEDURES 330

DISPATCHER 310

0 1 2 3 4 5 6 7 8 9

SERVER
730
INTERNET
728
ISP
726
LOCAL NETWORK
722
HOST
724
NETWORK LINK
720
700
STORAGE DEVICE
710
ROM
708
MAIN MEMORY
706
BUS
702
COMMUNICATION INTERFACE
718
PROCESSOR
704
DISPLAY
712
INPUT DEVICE
714
CURSOR CONTROL
716

FIG. 8

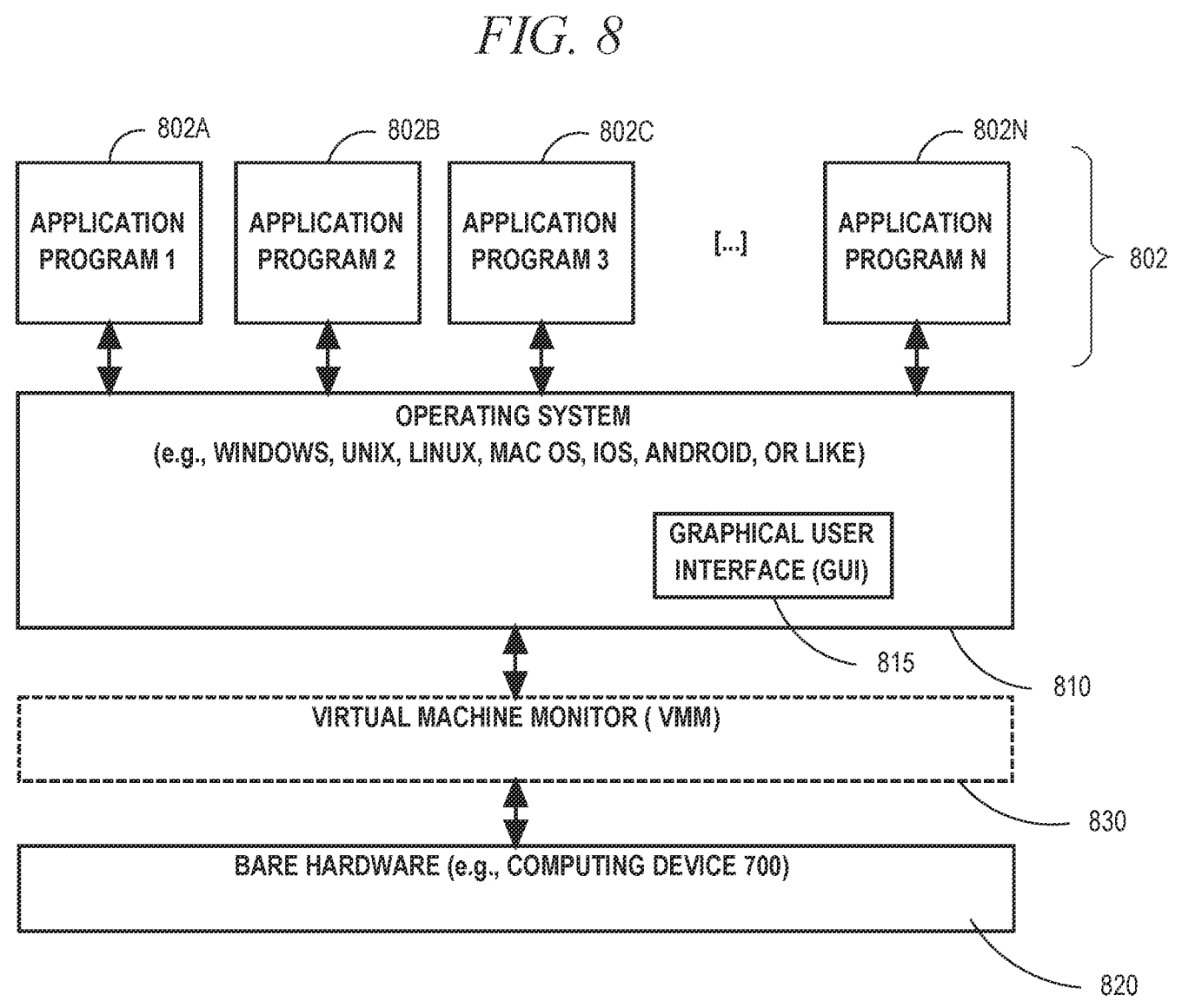

802A
APPLICATION PROGRAM 1

802B
APPLICATION PROGRAM 2

802C
APPLICATION PROGRAM 3

[...]

802N
APPLICATION PROGRAM N

802

OPERATING SYSTEM
(e.g., WINDOWS, UNIX, LINUX, MAC OS, IOS, ANDROID, OR LIKE)

GRAPHICAL USER INTERFACE (GUI)

815

810

VIRTUAL MACHINE MONITOR ( VMM)

830

BARE HARDWARE (e.g., COMPUTING DEVICE 700)

820

IN-DATABASE WORKFLOW ORCHESTRATION FOR SERVERLESS FUNCTION

FIELD OF THE INVENTION

The present invention relates to providing a framework for in-database workflow orchestration and execution of data-centric workflows. More particularly, the present invention relates to providing a framework that allows executing data-centric applications inside the database and a front-end for handling the framework.

BACKGROUND

Serverless functions or function-as-a-service (FaaS) frameworks have become the de facto choice for development of cloud applications. Serverless computing is a cloud-based model in which the cloud provider provisions computing resources on demand for its customers, managing all architectures, including cloud infrastructure. Despite its name, serverless computing still relies on cloud and physical servers to execute code. However, in "serverless" computing, developers and operators do not manage the physical or virtual servers, operating systems, networking, or other infrastructure components required for an application to run, but rather constructs applications from individual, independent functions. A "serverless function" is essentially a single-purpose piece of programming logic that is both stateless (does not maintain data) and ephemeral (is used and destroyed). A serverless function potentially lasts for only seconds and is designed to be triggered by a condition, such as a function call.

In serverless computing, applications are developed and deployed as a collection of independently invocable "functions," which serve requests from users without the developers having to be concerned with the underlying infrastructure. These functions can perform compute-centric operations or data-centric operations. Compute-centric operations are operations that are primarily concerned with performing computations. An example of a compute-centric operation is running a machine learning inference by calculating a plurality of probabilities. Data-centric operations are operations that are primarily concerned with accessing data. An example of a data-centric operation is retrieving a list of hotels in a given geographical location by accessing a plurality of database objects. Most serverless applications have two or more functions, while real-world applications usually have tens of functions.

For executing a serverless application, developers generally provide a function called the orchestrator that executes the application by calling individual serverless functions. For example, Amazon® Web Services (AWS) provides step functions that allow application developers to configure the orchestrator using a drag-and-drop console. This console translates the workflow to a JavaScript™ Object Notation (JSON)-format state machine representation that is used to orchestrate the workflow.

In a typical implementation, a user (or a "calling function") starts the execution of a serverless application by making a Representational State Transfer (REST) Application Programming Interface (API) call request over the Internet to the orchestrator. Based on the input received from this REST request, the orchestrator executes each serverless function. For executing a serverless function, the orchestrator must further send a request (REST request or HyperText Transport Protocol (HTTP) request, depending on the implementation) over a network, which could be the Internet or a local network. This request is received by an endpoint in the serverless computing framework, which allocates hardware resources for the serverless function and then starts the function. Then the serverless function performs some computation (if compute-centric) or a database operation (if data-centric) and returns to the orchestrator, which continues with executing the remainder of the application by calling the other serverless functions that comprise the application.

One should note that compute-centric and data-centric serverless functions are not completely disjoint or mutually exclusive. Many serverless functions will perform a combination of compute-centric and data-centric operations. The functions are described herein as disjoint for ease of understanding. Compute-centric functions can perform database operations, and data-centric functions can perform computations. However, in compute-centric functions, the runtime is dominated by computation, and in data-centric functions, the runtime is dominated by database operations.

In existing serverless frameworks, a database is always treated as a separate entity that is solely responsible for storing the data and providing APIs for handling the stored data. In existing serverless frameworks, the orchestrator and the serverless functions themselves are external to and separate from the database. Therefore, serverless functions must use APIs provided by the database vendors to store, retrieve, and update data in the database. In addition, the machines that host the database are always physically separated from the machines that host (and execute) the serverless functions. For example, consider an application written in the Java® programming language and running in Oracle® Cloud Infrastructure (OCI). This application will use the Java Database Connectivity (JDBC) library to establish a connection over the network to the database. This connection starts what is called a "database session" in the database. Then, the serverless function can execute a database operation by sending a request over the network. This request will be processed by the database session.

For existing serverless frameworks there are two major shortcomings that make them ill-suited for data-centric applications. The first shortcoming is due to the physical separation of the serverless functions and the database. In these cases, research has shown that a significant portion of the runtime of data-centric applications is spent in communication with the database compared to the actual execution time of the query. For example, the total time of function execution for a data-centric function may be 1117 μs, but the time to establish the database connection accounts from 777 μs of that time, with only 340 μs being spent issuing the remote query and only 23 μs being spent on database execution of the query. Thus, the overhead can occur in the form of establishing a database connection as well as issuing the remote query. And these steps must be executed at least once for every serverless function. This is especially problematic when considering time-sensitive services such as video streaming. Furthermore, this is in addition to the startup time of serverless functions that is spent in allocating the resources and loading the serverless functions before beginning execution.

The second shortcoming of existing serverless computing frameworks is that they are not suited for executing data-centric applications with transactional semantics and fault-tolerance. Transactional semantics dictate that two or more functions configured to be part of the same transaction should be "visible" together. This means that either all or none of the operations performed by functions in a transaction should be effective. This relieves the application developers from concerns about synchronization of different functions in a transaction and the burden of developing an entire transaction as a single function.

Fault tolerance is provided using run-to-completion semantics and exactly-once semantics. Run-to-completion semantics ensure that all functions of a workflow are eventually executed when faced with recoverable or transient errors (caused by the platform, for example). Additionally, run-to-completion semantics ensure that if a workflow crashes due to unrecoverable errors (e.g., connection to the database is lost), then the workflow will be restarted and run to completion. Exactly-once semantics are essential for data-centric applications because operations on data are usually triggered by events like REST API requests. In an application with two transactions, if a first transaction finishes and the second transaction fails, then the application caller will trigger this data-centric application once again (e.g., to ensure run-to-completion semantics). In that case, without exactly-once semantics, the first transaction would be executed twice, which may be detrimental to the application logic. Multiple executions of a transaction may lead to data duplication or existence of stale data, which may corrupt the output of the application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 3 is a block diagram depicting a component overview of in-database application execution in accordance with an illustrative embodiment.

FIG. 6 depicts an overview of the internal working of an in-database workflow execution framework in accordance with an illustrative embodiment.

FIG. 8 is a block diagram of a basic software system that may be employed for controlling the operation of a computer system to implement aspects of the illustrative embodiments.

DETAILED DESCRIPTION

Figure 2:
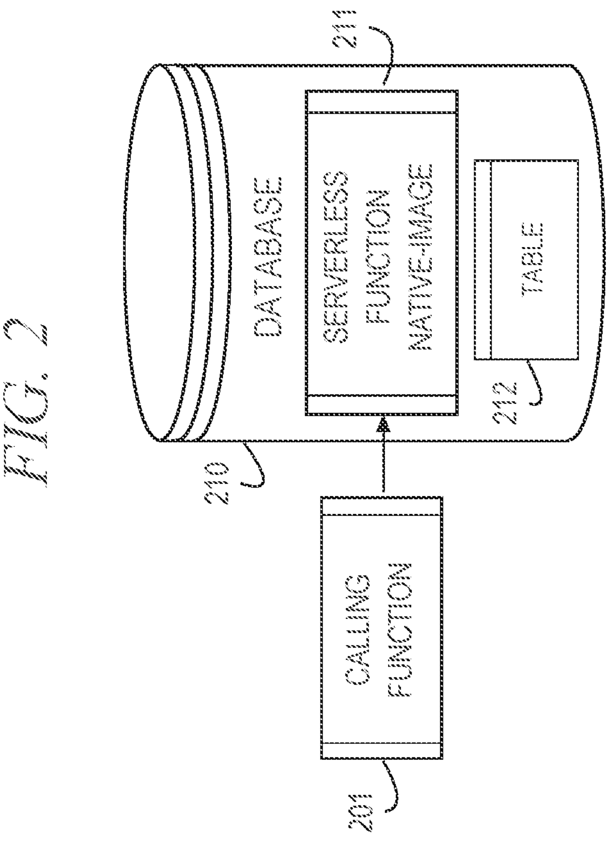
FIG. 2 is a block diagram illustrating a serverless function as a native-image stored procedure in accordance with an illustrative embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide a framework for in-database workflow orchestration and execution of data-centric FaaS workflows. Popular serverless frameworks are ill-suited for executing data-centric workflows because they were designed for idempotent functions, which communicate with databases to maintain state information. This leads to high execution overhead and a lack of consistency and reliability guarantees of the data. The illustrative embodiments provide a framework for executing data-centric workflows within the database session, thus achieving workflow execution with no additional process creation, virtualization, or network overhead. This allows the entire workflow to be executed with a single database call from a dispatcher (a publicly exposed endpoint of the framework). In contrast, previous frameworks used external orchestrators to execute data-centric workflows, which require one database round trip per remote query or per transaction. For larger application workflows, this becomes a significant overhead.

Traditional serverless functions are typically developed in an interpreted programming language, such as the Java® programming language, and executed in a runtime environment, such as a Java® Virtual Machine (JVM). In accordance with the illustrative embodiments, the user-provided serverless functions that comprise the application workflow are compiled into native-image binary executables and deployed as stored procedures in a DBMS and defined as such by the DBMS. A native-image procedure is written in source code in, for example, the Java® programming language. The source code is compiled into byte code which is then compiled to produce a standalone binary (an executable or a shared library). The native-image stored procedures have a much lower startup time and memory overhead compared to traditional interpreted stored procedures. Native-image stored procedures can perform database operations with the overhead of a simple function call. Thus, using native-image stored procedures greatly reduces memory and execution time overhead compared to traditional serverless computing frameworks. The framework of the illustrative embodiments is not limited to using any single programming language, like the Java® programming language, for creating stored procedures.

In accordance with the illustrative embodiments, an application workflow is configured using workflow metadata, which specifies the native-image stored procedures that make up the application workflow and transaction boundaries at runtime. Thus, the framework provides dynamic transactions that can be specified at runtime, and multiple transactions can make use of the same native-image stored procedures. Existing solutions either use an external transaction manager or compile the stored procedures in such a way that each stored procedure is a self-contained transaction.

In some embodiments, the application workflow execution framework uses the transaction manager of the database management system (DBMS), which allows dynamically managing cross-function transactions within the database session without added overhead. Moreover, the framework of the illustrative embodiments ensures low overhead fault tolerance using run-to-completion and exactly-once semantics. This allows the same set of native-image stored procedures to be used in various combinations in different application workflows and transactions without violating run-to-completion or exactly-once semantics, thus providing fault tolerance and data integrity without added overhead.

Native-Image Stored Procedures

Figure 1:
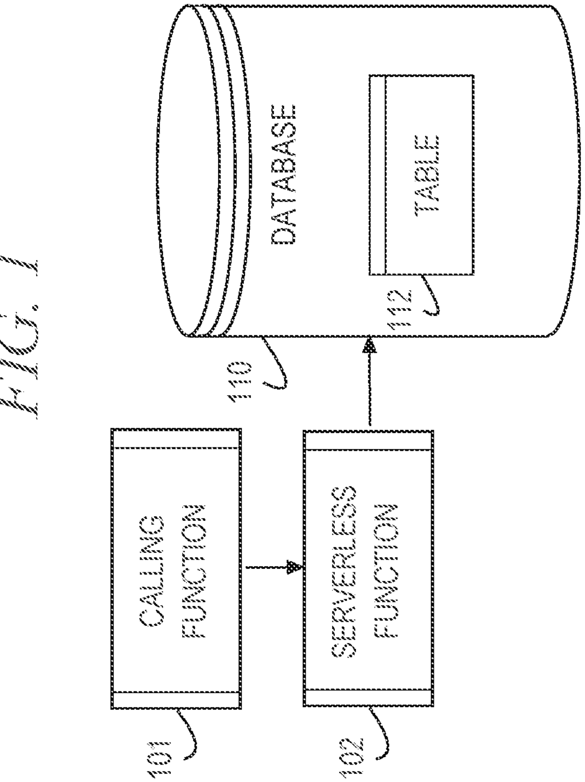
FIG. 1 is a block diagram illustrating a serverless function performing a database operation using a traditional workflow framework.

FIG. 1 is a block diagram illustrating a serverless function performing a database operation using a traditional workflow framework. A calling function 101 calls a serverless function 102, which may be a Java® bytecode procedure using a JVM. The serverless function 102 establishes a database session with database 110 in order to perform a database operation (read, update, store) on database table 112. Although a table is shown in FIG. 1, database 110 may be implemented using a DBMS and may manage data in the form of tables, objects, documents, etc. For example, database 110 may be implemented as a relational database management system (RDBMS) that manages a collection of tables (or data frames). As another example, database 110 may be a document DBMS ("DOCS") that manages a collection of JSON objects.

The illustrative embodiments provide a framework for executing serverless functions as native-image stored procedures within a database. In some embodiments, the GraalVM™ Native-Image tool is used to compile serverless functions into native-image stored procedures. GraalVM™ is a Java® Development Kit (JDK) that speeds up the performance of Java® and JVM-based applications and simplifies the building and running of Java® cloud native services. Native-image is a tool that can ahead-of-time (AOT) compile a serverless function into an executable that can be executed natively inside a database session. The native-image stored procedure is compiled such that when executed, it will share the same address space in memory as the database session. Essentially, the native-image stored procedure is equivalent to a database function execution in the database session.

While the illustrative embodiments are described with respect to the Java® programming language, other languages could be used in alternative implementations. For example, a native-image procedure may be written in source code in the Python programming language, for example. Executing a Python function with native-image means that the function must be just-in-time (JIT) compiled rather than AOT compiled. That said, this approach would be faster at startup than running GraalPython (a GraalVM™ based implementation of Python) in HotSpot (JVM) because of the native-image tool.

Ahead-of-time (AOT) compilation is a technique used for creating native-image procedures that involves analyzing and executing a serverless function. AOT compilation performs points-to-analysis to find all the reachable sections of the function. During points-to-analysis, AOT compilation initializes the classes that are reachable in the code. In addition, AOT compilation creates a snapshot of the runtime heap of the serverless function. Thus, the native-image stored procedure generated using AOT compilation is already partially initialized, and it has faster startup and lower execution time. A native-image stored procedure has a lower memory footprint, because points-to-analysis only loads sections of code that are reachable, and no redundant code is stored in memory. For example, if only one field of a class is used, then the other fields are not resident in memory.

FIG. 2 is a block diagram illustrating a serverless function as a native-image stored procedure in accordance with an illustrative embodiment. A calling function 201 calls a serverless function native-image stored procedure 211, which executes within a database session within database 210 in order to perform a database operation (read, update, store) on database table 212. The resulting native-image stored procedure 211 is capable of utilizing database functionality within the same database session as the caller of the stored procedure. This eliminates memory allocation and context-switch overheads that occur in having serverless functions running as independent processes. Moreover, using stored procedures eliminates the network overhead that is caused by database connection setup and issuing of remote queries to the database. After compilation, at any time in the future, a calling function can request execution of the stored procedure. In that case, the native-image that contains the requested stored procedure is loaded into the memory of the database session process and the stored procedure is executed.

For performing operations on data (read, update, store) from within the native-image procedure, the framework includes a modified backend for popular database-client APIs, such as the JDBC library. The modified backend performs database operations within the same process as the native-image procedures. This is in contrast to the traditional way that serverless functions perform database operations, which involves establishing a connection (i.e., starting an additional database session) and issuing a remote query. Thus, with the framework of the illustrative embodiments, the database operations (read, update, store) have the same overhead as a simple function call.

The framework of the illustrative embodiments has an added advantage over all prior solutions, because the serverless functions are now native-image stored procedures, which incur minimal startup overhead compared to starting up a Java® bytecode procedure using JVM. Instead of starting up a serverless function and the serverless function then making a remote database operation, the calling function can directly make a simple execute call to the database and the native-image stored procedure executes the entire application logic. This execution can involve multiple calls to the database, which are executed as simple function calls.

In some embodiments, a native-image stored procedure can have one or more stored procedures. In other words, more than one serverless function can be compiled into a single native-image stored procedure.

In-Database Serverless Application Execution

To provide an interface for migration, execution, and guarantees across entire applications, the illustrative embodiments provide a framework for in-database orchestration. FIG. 3 is a block diagram depicting a component overview of in-database application execution in accordance with an illustrative embodiment. For migration of existing serverless applications, creation of new serverless applications, and execution of application workflows, the illustrative embodiments provide a dispatcher 310. In some embodiments, dispatcher 310 is an HTTP server/REST endpoint that executes in a machine that can connect to the database with relatively low latency. An application developer migrating or creating a serverless application sends the serverless functions in a language supported by the GraalVM™ Native-Image tool (e.g., Java, JavaScript, Scala, etc.) to dispatcher 310. The dispatcher 310 then performs AOT compilation on the serverless functions to generate native-image stored procedures 330 and stores them as database stored procedures.

The set of native-image stored procedures 330 can comprise an entire application or a smaller workflow in a larger complex application. For example, an application workflow for making a hotel reservation may include serverless functions, and thus corresponding native-image stored procedures, for searching a database for a hotel room, determining whether a particular hotel room is available on a given date, updating the database to indicate that the particular hotel room is reserved, and accepting payment for the hotel room.

When a calling function (or user) requires workflow (or application) execution, the calling function calls dispatcher 310 with workflow metadata (not shown) that is required to execute the workflow (or application). After the execution is finished, the dispatcher 310 returns a result or error information to the calling function. Dispatcher 310 is not responsible for executing the workflow; executing the workflow is the responsibility of orchestrator 320. In some embodiments, dispatcher 310 verifies whether the provided workflow metadata is valid. In one embodiment, a calling function or user may bypass dispatcher 310 to execute a single function directly, as shown in FIG. 3.

In addition, as shown in FIG. 3, dispatcher 310 is outside the database network boundary, and orchestrator 320 and native-image stored procedures are inside the database network boundary. All components to the right of the database network boundary in FIG. 3 are executed within the database session. Furthermore, all components above the database code client native image boundary in FIG. 3 are part of the database code, while the components below this boundary are components that are created by the client. In some embodiments, the database code client native image boundary can also server as a security boundary. For example, one client's native-image stored procedures should not access another client's procedures or data.

Orchestrator 320 is a software component inside the database. Orchestrator 320 runs within the database session and shares the same memory and address space as the database session process. Orchestrator 320 receives information (i.e., workflow metadata) from dispatcher 310 about the workflow to be executed. Orchestrator 320 uses the workflow metadata received from dispatcher 310 to execute the workflow. Because orchestrator 320 runs within the database session and the orchestrator executes the native-image stored procedures 330 like a function call, every native-image stored procedure runs inside the database session. The serverless function is reduced to a simple and efficient function call. Moreover, usage of orchestrator 320, and the fact that orchestrator 320 runs in the same process as the database session (a new process is not created), allows for dynamic, cross-functional transaction semantics.

Figures 4A, 4B, 5:
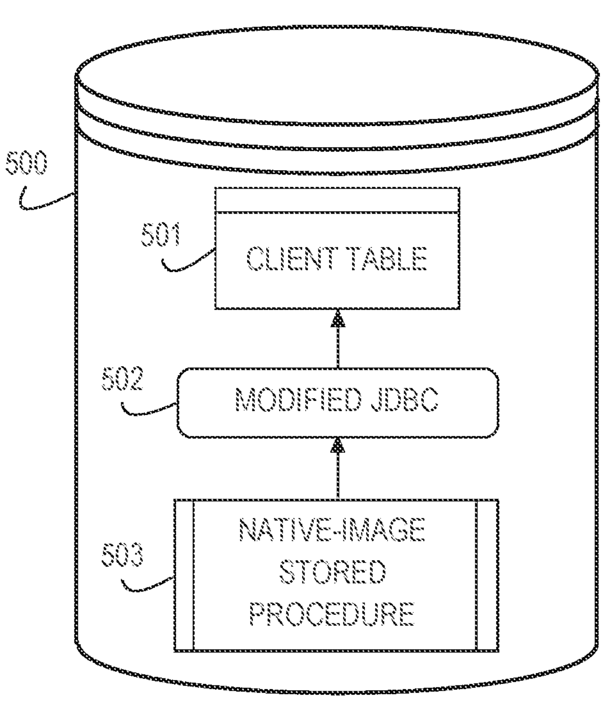
FIG. 4A illustrates transaction boundaries in which each stored procedure is an independent transaction in accordance with an embodiment.
FIG. 4B illustrates specifiable transaction boundaries in which multiple stored procedures comprise a transaction in accordance with an illustrative embodiment.
FIG. 5 illustrates native-image stored procedure execution using a modified backend in accordance with an illustrative embodiment.

While executing a workflow or application, the framework of the illustrative embodiments provides application users the ability to specify transaction boundaries at runtime. The framework of the illustrative embodiments utilizes the in-process transaction management to achieve these dynamic transactional semantics. In general, each function of the workflow is considered as an independent transaction. FIG. 4A illustrates transaction boundaries in which each stored procedure is an independent transaction in accordance with an embodiment. As shown in FIG. 4A, transaction 0 comprises stored procedure 0, transaction 1 comprises stored procedure 1, and transaction 2 comprises stored procedure 2.

In accordance with an illustrative embodiment, users can specify the transaction boundaries within the workflow metadata provided to dispatcher 310. This allows users to execute the same workflow with customizable transaction boundaries depending on their requirements. FIG. 4B illustrates specifiable transaction boundaries in which multiple stored procedures comprise a transaction in accordance with an illustrative embodiment. As shown in FIG. 4B, workflow metadata can specify that transaction 0 comprises stored procedure 0 and stored procedure 1 and transaction 1 comprises stored procedure 2. Therefore, if procedure 0 completes and procedure 1 fails, then transaction 0 will be rolled back, and the orchestrator will repeat the transaction, thus calling both procedure 0 and procedure 1 again. That is, transaction 0 completes and commits only if both procedure 0 and procedure 1 complete successfully.

Orchestrator 320 provides fault-tolerance guarantees for the entire workflow by ensuring run-to-completion and exactly-once semantics. Given the hotel reservation example above, run-to-completion semantics ensure that every function of the workflow completes and calls each function until it completes. For example, if the function for updating the database to indicate that a particular hotel room is reserved fails, it is important that this function is re-called to ensure payment is not received for a hotel room that was not successfully reserved. The exactly-once semantics ensure that payment is not received twice for the same hotel room.

In accordance with an illustrative embodiment, orchestrator 320 performs all of these operations in the same database session. Orchestrator logs outputs of critical functions and transaction semantics to verify whether a transaction was executed successfully or not. Critical functions (stored procedures) are functions that are required for ensuring exactly-once semantics. Critical functions either modify the data in the database, such as client table 340, or supply inputs to functions that modify the data in the database. Critical functions are computed using an algorithm called Selective Function Recording. The output of the critical functions is used to determine whether a transaction has finished, because the output is visible in the log only if the transaction commits. If the transaction crashes due to a recoverable error (like database out-of-memory), then orchestrator 320 rolls back and retries the transaction; otherwise, orchestrator 320 moves on to the next transaction. A transaction, once finished, will never be run again.

In-Process Table Operations

For executing serverless functions in the database session process, it is essential that operations can be performed on tables within the database session process. As stated above, the illustrative embodiments provide a modified JDBC API backend such that instead of creating a new database session, the API performs operations on the tables within the same database session. This allows serverless function developers to build functions without having to be concerned with the framework's in-process native-image stored procedure execution. FIG. 5 illustrates native-image stored procedure execution using a modified backend in accordance with an illustrative embodiment. Native-image stored procedure 503 is stored within database 500 and makes function calls to modified JDBC API 502 to perform operations (read, update, store) on client table 501. As mentioned above, the data that is accessed by native-image stored procedure 503 is shown as a table 501; however, the data may also be an object or document in alternative implementations.

Procedural Over View

FIG. 6 depicts an overview of the internal working of an in-database workflow execution framework in accordance with an illustrative embodiment. In step 0, after receiving a request for compilation of a serverless workflow or application to native-image stored procedures, the dispatcher 310 compiles the serverless functions into one or more native-image stored procedures 330 depending on the configuration requested by the user and stores the native-image stored procedures 330 in the database. Along with this compilation, dispatcher 310 can create any tables that may be required for the workflow, such as client table 340.

Afterwards, at some point in the future, the client requests the execution of the workflow. To request the workflow, the client provides workflow metadata. In one embodiment, the workflow metadata is represented as a JSON dictionary. An example of workflow metadata is as follows:

```
{
  "txn0": [
    {
      "className": "com.org.package.Class1",
      "funcName": "f1",
      "readOnly": true,
      "inParams": ["String"],
      "inParamsSrc": ["src"]
    },
    {
      "className": "com.org.package.Class2",
      "funcName": "f2",
      "readOnly": false,
      "inParams": ["Integer"],
      "inParamsSrc": ["com.org.package.Class1.f1"]
    }
  ],
  "txn1":[
    {
      "className": "com.org.package.Class3",
      "funcName": "f3",
      "readOnly": false,
      "inParams": ["Integer", "Integer"],
      "inParamsSrc": ["src", "com.org.package.Class2.f2"]
    }
  ]
}
```

The example metadata shown above in JSON format is provided for explanation purposes and is not intended to be limiting, as metadata may change significantly depending on the implementation.

This workflow metadata includes the names of the stored procedures (e.g., className, funcName) that should be executed in the workflow, the data types of input arguments (e.g., inParams) of the stored procedures, whether a stored procedure modifies the data in the database (e.g., readOnly), the transaction boundaries (e.g., txn0, tsn1), and the data-flow information of the workflow. The data flow information is specified using the inParamsSrc property in the metadata.

In the workflow metadata, inParamsSrc has a length equal to the number of arguments of that source procedure. In the above example, it can be seen that f1 takes its input from the user directly, which means that the value of this input argument must be provided by the calling function (or user). The function f2 takes the output of f1 as an input specified by the inParamsSrc property of f1. The function f3 takes two arguments as input. The first argument is supplied directly by the caller along with the metadata, as indicated by src in the inParamsSrc property. The second argument is the output of f2 in the inParamsSrc property. The caller can specify the transaction boundaries using the txn(i) key.

In step 1, dispatcher 310 takes this workflow metadata and the caller supplied arguments and populates them in the workflow metadata table 610. Then, in step 2, dispatcher 310 calls orchestrator 320 to execute the workflow. In one embodiment, to call orchestrator 320, dispatcher 310 issues a remote query to the database. Thus, there is one remote query for the entire workflow.

Storing the metadata in step 1 and executing the workflow in step 2 provides users with the flexibility to reuse workflow metadata without having to incur the additional cost of storing the metadata each time. Essentially, like step 0, step 1 may also be performed once for the entire lifetime of the application. Also note that each native-image stored procedure can use a separate schema that can be specified during compilation.

Orchestrator 320 is designed as a component within the database that is capable of executing the entire workflow. Orchestrator 320 runs in the same database session that dispatcher 310 established.

In step 3, when orchestrator 320 receives the request to execute the workflow from dispatcher 310, orchestrator 320 fetches the workflow metadata and input arguments from workflow metadata table 610. In step 4, after processing the workflow metadata, orchestrator 320 executes the workflow by loading the native-images and calling the stored procedures. The native-image stored procedures 330 are also executed in the same database session as the orchestrator 320. In step 5, native-image stored procedures 330 perform operations on data, such as client table 340, using JDBC API in the same database session process. In step 6, native-image stored procedures 330 return to orchestrator 320.

In step 7, when critical functions finish, orchestrator 320 stores their outputs in workflow log 620. The data in this table is used to ensure exactly-once semantics, as discussed above. In step 8, when a transaction finishes, orchestrator 320 commits the transaction to client table 340 in accordance with the transaction boundaries specified in the workflow metadata. In some embodiments, a native-image stored procedure may be allowed to commit transactions; however, in general transactions are committed by the orchestrator in this framework.

In step 9, when the entire workflow has finished, orchestrator 320 returns control back to dispatcher 310, which then returns the result to the calling function (or user). The result may be a notification that the workflow completed successfully; however, the result returned to the client can contain an output of a computation performed by a native-image stored procedure or an output of the workflow. Alternatively, the result may include an error code or state information from workflow log 620.

When a software component, such as a dispatcher or orchestrator, or referred or otherwise described herein as performing an action, a computer system process executes the software component to cause performance of the action.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
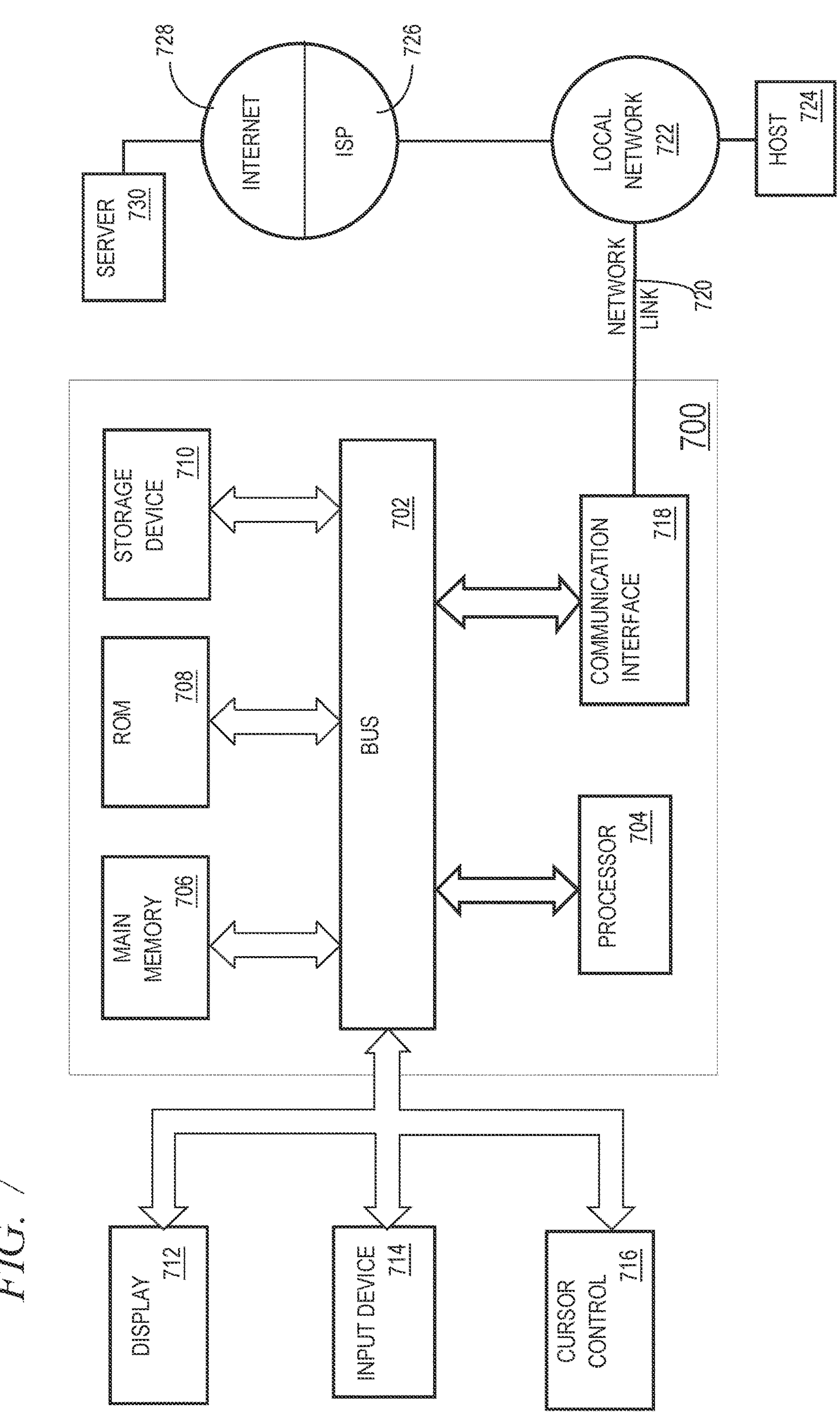
FIG. 7 is a block diagram that illustrates a computer system upon which aspects of the illustrative embodiments may be implemented.

For example, FIG. 7 is a block diagram that illustrates a computer system 700 upon which aspects of the illustrative embodiments may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving, at a database system in a database session, a remote query that requires execution of an application workflow based on workflow metadata associated with the application workflow, wherein:

the workflow metadata specifies a plurality of native-image stored procedures to be executed in the application workflow, and the plurality of native-image stored procedures are stored within the database system;

executing, by a workflow orchestrator, the application workflow to perform functions that require access to one or more database objects in the database system, wherein:

the workflow orchestrator executes within the database session in the database system, a database session process executes within the database session, and the workflow orchestrator shares the same memory and address space as the database session process, and executing the application workflow comprises executing the plurality of native-image stored procedures within the database session to access the one or more database objects, wherein the method is performed by one or more computing devices.

2. The method of claim 1, further comprising:

receiving, by a dispatcher executing in a machine connected to the database system, a call to compile a plurality of serverless functions;

performing, by the dispatcher, ahead-of-time compiling of the plurality of serverless functions to form the plurality of native-image stored procedures; and storing, by the dispatcher, the plurality of native-image stored procedures in the database system.

3. The method of claim 2, further comprising:

responsive to the dispatcher receiving the workflow metadata, verifying, by the dispatcher, whether the workflow metadata is valid; and responsive to determining the workflow metadata is valid, storing the workflow metadata in a workflow metadata table.

4. The method of claim 2, wherein the dispatcher is a Representational State Transfer (REST) endpoint.

5. The method of claim 1, wherein the workflow metadata specifies transactional boundaries and the workflow orchestrator enforces the specified transactional boundaries.

6. The method of claim 5, wherein executing the application workflow comprises:

logging, by the workflow orchestrator, outputs of the plurality of native-image stored procedures in a workflow log; and determining whether a transaction has executed successfully based on the workflow log.

7. The method of claim 6, wherein the workflow orchestrator ensures exactly-once semantics.

8. The method of claim 1, wherein the workflow orchestrator commits completed transactions to one or more of the plurality of database objects.

9. The method of claim 1, wherein the workflow metadata includes one or more of:

names of the plurality of native-image stored procedures, data types of input arguments of the plurality of native-image stored procedures, whether each of the plurality of native-image stored procedures modifies the one or more database objects, or data flow information of the application workflow.

10. The method of claim 1, further comprising:

responsive to completing execution of the application workflow, returning a result to a calling function or requesting user.

11. The method of claim 1, wherein executing the plurality of native-image stored procedures comprises loading the plurality of native-image stored procedures into the memory of the database session process.

12. The method of claim 1, wherein the plurality of native-image stored procedures access the one or more database objects by calling a backend application programming interface within the database session process.

13. The method of claim 2, further comprising creating, by the dispatcher, the one or more database objects required by the application workflow.

14. One or more non-transitory storage media storing instructions which, when executed by one or more computing devices, cause:

receiving, at a database system in a database session, a remote query that requires execution of an application workflow based on workflow metadata associated with the application workflow, wherein: the workflow metadata specifies a plurality of native-image stored procedures to be executed in the application workflow, and the plurality of native-image stored procedures are stored within the database system;

executing, by a workflow orchestrator, the application workflow to perform functions that require access to one or more database objects in the database system, wherein: the workflow orchestrator executes within the database session in the database system, a database session process executes within the database session, and the workflow orchestrator shares the same memory and address space as the database session process, and executing the application workflow comprises executing the plurality of native-image stored procedures within the database session to access the one or more database objects.

15. The one or more non-transitory storage media of claim 14, wherein the instructions further cause:

receiving, by a dispatcher executing in a machine connected to the database system, a call to compile a plurality of serverless functions;

performing, by the dispatcher, ahead-of-time compiling of the plurality of serverless functions to form the plurality of native-image stored procedures; and storing, by the dispatcher, the plurality of native-image stored procedures in the database system.

16. The one or more non-transitory storage media of claim 15, wherein the instructions further cause:

responsive to the dispatcher receiving the workflow metadata, verifying, by the dispatcher, whether the workflow metadata is valid; and responsive to determining the workflow metadata is valid, storing the workflow metadata in a workflow metadata table.

17. The one or more non-transitory storage media of claim 14, wherein the workflow metadata specifies transactional boundaries and the workflow orchestrator enforces the specified transactional boundaries.

18. The one or more non-transitory storage media of claim 17, wherein executing the application workflow comprises:

logging, by the workflow orchestrator, outputs of the plurality of native-image stored procedures in a workflow log; and determining whether a transaction has executed successfully based on the workflow log.

19. The one or more non-transitory storage media of claim 14, wherein the instructions further cause:

responsive to completing execution of the application workflow, returning a result to a calling function or requesting user.

* * * * *